L. R. HEIM.
GRINDING MACHINE.
APPLICATION FILED JULY 13, 1917.
1,264,929.
Patented May 7, 1918.
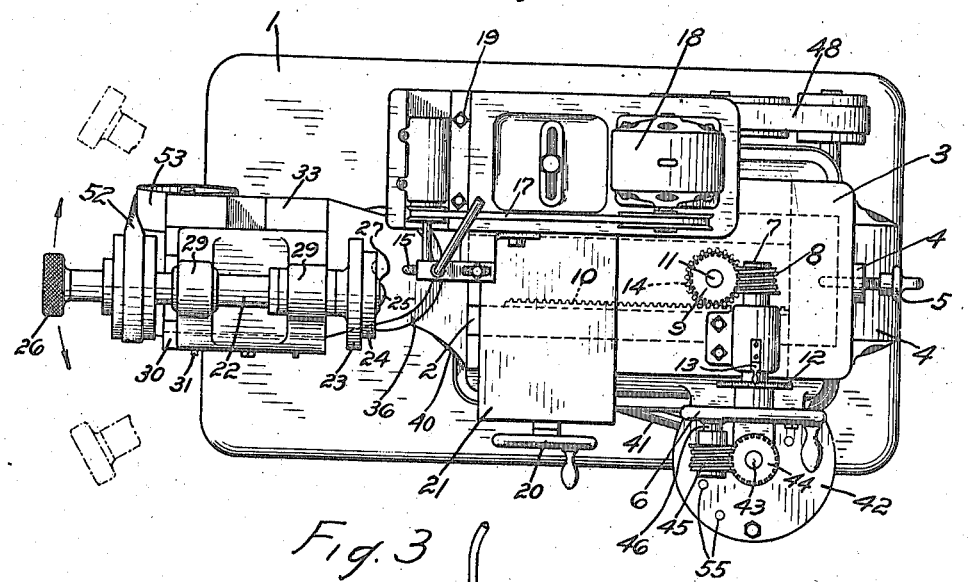
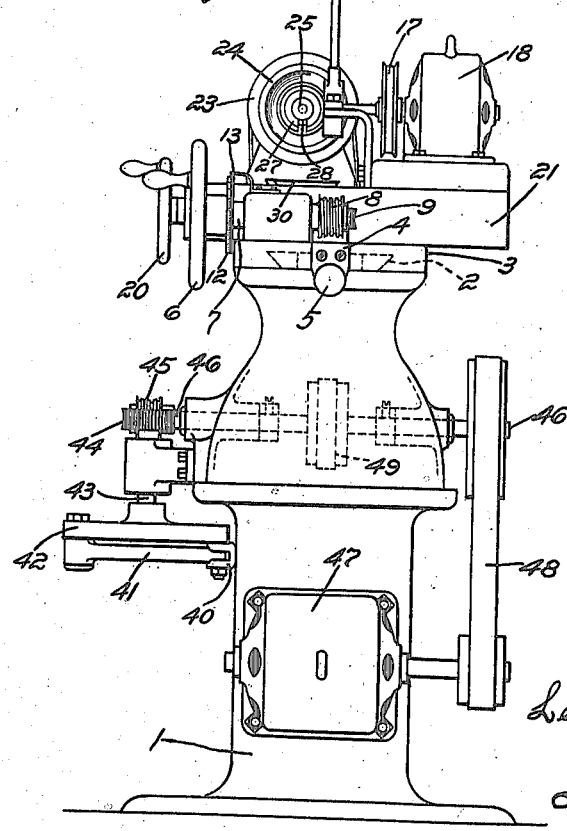
INVENTOR
Lewis R. Heim
BY
ATTORNEY

UNITED STATES PATENT OFFICE.

LEWIS R. HEIM, OF DANBURY, CONNECTICUT, ASSIGNOR TO THE BALL AND ROLLER BEARING COMPANY, OF DANBURY, CONNECTICUT, A CORPORATION OF CONNECTICUT.

GRINDING-MACHINE.

1,264,929.  Specification of Letters Patent.  Patented May 7, 1918.

Application filed July 13, 1917. Serial No. 180,460.

*To all whom it may concern:*

Be it known that I, LEWIS R. HEIM, a citizen of the United States, residing at Danbury, county of Fairfield, State of Connecticut, have invented an Improvement in Grinding-Machines, of which the following is a specification.

This invention relates to grinding machines, and has especial reference to means for grinding grooves in thrust and annular bearings, and similar articles, wherein it is desired to effect relative oscillation between the work and the grinding wheel while simultaneously driving both the work and the grinding wheel.

The machine herein illustrated is especially designed to accomplish these results, and in its preferred form embodies a rotary and oscillatory work holder coöperating with the grinding wheel, together with adjustments whereby the various parts can be accurately set to perform the various functions.

In the accompanying drawings,

Fig. 2 is a plan view, and

Fig. 3 is an end elevation seen from the right in Fig. 1.

Figure 1:
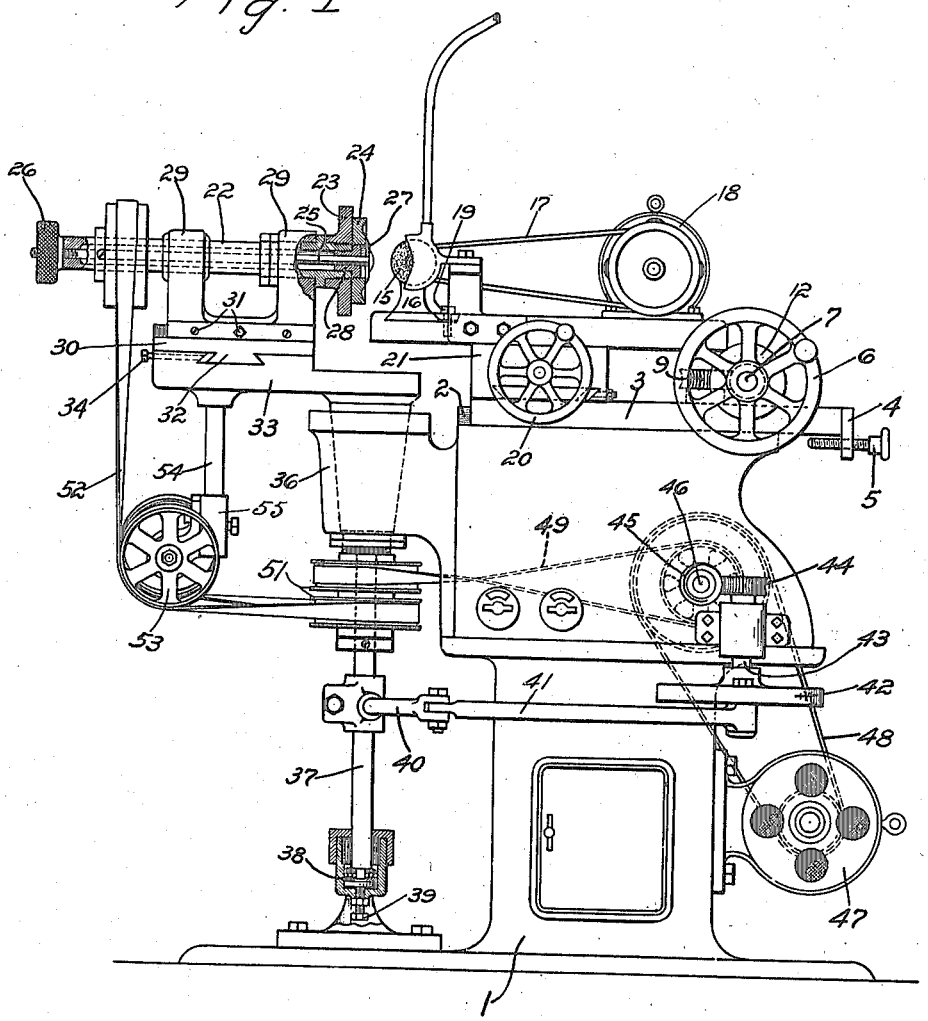
Figure 1 is an elevation of the machine.

1 represents the base carrying at its upper portion on ways 2 a sliding grinder carriage 3, provided with a projection 4 carrying a limiting adjusting screw 5. The carriage is operated by means of a hand wheel 6 whose shaft 7 carries a worm 8 meshing with a gear 9 whose shaft 11 carries a pinion 14 which in turn meshes with a rack 10 mounted on the base. Rotating with the hand wheel 6 is an index scale 12 which coöperates with a pointer 13 so that the movement of the grinding wheel carriage can be very accurately controlled. 15 is the grinding wheel, of usual form, mounted in bearing 16 and driven by belt 17 from motor 18. The grinding wheel may be of any desired shape, and is herein shown as of a form suitable for grinding the race ways in either ball thrust bearings, or annular ball bearings. The grinding wheel bearing 16 is transversely adjustable of the carriage 3, being mounted in a slide way and clamped by means of set screws 19. A finer and more accurate cross feed of the grinding wheel is obtained by means of hand wheel 20 actuating the slide 21 on which the grinder and motor 18 are mounted.

22 is a hollow work spindle carrying a disk or face plate 23 against which the work 24 is clamped by means of a clamping rod 25 extending through the spindle 22 and carrying a thumb nut 26 mounted on a threaded portion of said rod. The rod 25 is headed and bears on a clamping washer 27 which engages the work 24. 28 is a bushing which fits snugly but removably in the end of the hollow spindle 22 and having a head which fits the center hole in the work 24, so that the work is thus centered relatively to the axis of rotation of the spindle 22. The spindle 22 revolves in bearings 29, and is held against endwise shifting, and the bearings 29 are slidably mounted on a plate 30 which is held in adjusted position by set screws 31, thus permitting the work to be adjusted relatively to the grinding wheel 15. The plate 30 carries a transverse slide 32 which slides in a base 33 and is held by set screw 34, to provide a lateral adjustment of the work relatively to the grinding wheel. The longitudinal adjustment of the work relatively to the grinding wheel is desirable where the thickness of the work or the depth of the groove to be ground varies, especially where the work is itself to be oscillated, as hereinafter to be described. The lateral adjustment of plate 30 on base 33 provides an adjustment to vary the diameter of the groove to be ground in a bearing, such as illustrated herein.

The base 33 is pivoted in a bracket 36, and carries a shaft 37 which is supported in a step bearing 38 near the base of the machine. The bearing 38 is vertically adjustable by means of a screw 39. It will be seen that the upper bearing of the base 33 is conical, so that the weight will be properly supported, and the adjustable bearing 38 provides a vertical adjustment which relieves excessive friction. 40 is an arm carried by shaft 37 and connected by pitman 41 to a crank 42 carried on a vertical shaft 43, which latter is provided at its upper end with a worm gear 44 which is driven by a worm 45 on horizontal shaft 46. The shaft 46 is driven from motor 47 by means of belt 48, thus oscillating the entire work carrier on the shaft 37 as an axis. The shaft 46 drives the spindle 22 by means of belt 49 through connected pulleys 51 loosely mounted on shaft 37 and thence by belt 52 passing around idlers 53 mounted on a block 55 adjustably secured to an arm 54 depending from the base 33. The belt 52 runs on a pulley 56 fixed to the hollow work-carrying shaft or spindle 22, said belt running from one of the idlers 53 to said pulley 56 and thence to the other side of said idlers, said belt passing around one of the pulleys 51 on the shaft 37, which is the axis of the oscillating work-head or base 33. By virtue of the belting system just described the tension on the belt 52 will be the same at all points of the oscillation of the work-head or base 33 and of the work-carrying shaft or spindle 22 mounted thereon, thus contributing to accurate grinding, owing to the smooth and uniform rotation of the work-holder. The tension of the belt 52 may be properly regulated by vertical adjustment of the block 55 on the arm 54, and on which block the idlers 53 are mounted. The amount of oscillation imparted to the work will be controlled by holes 55 in crank plate 42 disposed at different distances from the center.

In grinding a ball thrust bearing for example, the blank will first be centered and clamped on the spindle 22 by means of thumb nut 26. The work will then be adjusted so that the grinding point will be in line with the axis of shaft 37, which will necessitate use of one or more of the adjustments above described, depending upon the diameter and depth of the groove to be ground. The stop screw 5 will control the depth of the groove, and the scale 12 will enable the operator to limit the movement of the grinding wheel toward the work so that the grinding wheel will not pass beyond the proper grinding point in the axis of shaft 37.

The machine herein described has several advantages in operation such as the universal adjustment of the oscillating work support both laterally and longitudinally without interfering with the drive, and also the means for varying the oscillation. In work requiring accuracy, such as for bearings, a delicate and accurate feed of the grinding wheel is desired, which is obtained herein by the rack and pinion adjusting means described, while the grinder can itself be adjusted to suit the requirements of the work.

Various modifications and changes may be made in the specific means disclosed without departing from the scope of the appended claims.

What is claimed, is:

1. In a grinding machine, the combination with a suitable base, of a carriage slidingly mounted on said base, a rotary grinding wheel mounted on said carriage, a rotating and oscillating work-holder, a hand wheel and gearing connections with said carriage whereby the latter may be adjusted toward and from said work-holder, a rotary index scale movable with said hand wheel and a stationary index or pointer coöperating with said index scale to enable the attendant to adjust the grinding wheel to any desired position with relation to said work-holder.

2. In a grinding machine, the combination with a suitable base, of a carriage slidingly mounted on said base, a rotary grinding wheel mounted on said carriage, a rotating and oscillating work-holder, a hand wheel and gearing connections with said carriage whereby the latter may be adjusted toward and from said work-holder, a rotary index scale movable with said hand wheel, a stationary index or pointer coöperating with said index scale to enable the attendant to adjust the grinding wheel to any desired position with relation to said work-holder, and an adjustable stop to limit the movement of said grinding wheel toward said work holder.

3. In a grinding machine, the combination with a grinding wheel and means for driving the same, of a work-holding device comprising a hollow rotary spindle or shaft carrying a work-holder, means for driving said hollow spindle, and a work-clamping rod passing through said spindle and provided with means for engaging the work and with a thumb-nut by means of which the work-clamping means may be tightened against the work.

4. In a grinding machine, the combination with a grinding wheel and means for driving the same, of a work-holder comprising a base, a rotary work-carrying shaft supported by said base, an oscillating shaft by which said base is sustained, conical and step bearings for said shaft, and means for adjusting said step bearing vertically to relieve excessive friction on said conical bearing.

5. In a grinding machine, the combination with a rotating grinding wheel, of an oscillating work-head, a rotating work-carrying shaft or spindle mounted on said work-head so as to oscillate therewith, a pulley on said shaft or spindle, a pulley on the axis of said oscillating work-head, two idlers intermediate said pulleys, and a belt running over said pulleys and idlers and serving to drive said work-carrying shaft or spindle.

6. In a grinding machine, the combination with a rotating grinding wheel, of an oscillating work-head, a rotating work-carrying shaft or spindle mounted on said work-head so as to oscillate therewith, a pulley on said shaft or spindle, a pulley on the axis of said oscillating work-head, two idlers intermediate said pulleys, a belt running over said pulleys and idlers and serving to drive said work-carrying shaft or spindle, and means for regulating the tension of said belt.

7. In a grinding machine, the combination with a rotating grinding wheel, of an oscillating work-head, a rotating work-carrying shaft or spindle mounted on said work-head so as to oscillate therewith, a pulley on said shaft or spindle, a pulley on the axis of said oscillating work-head, two idlers intermediate said pulleys, a belt running over said pulleys and idlers and serving to drive said work-carrying shaft or spindle, and means for regulating the tension of said belt, said means consisting of an adjustable block on which said idlers are mounted.

8. In a grinding machine, the combination with a rotating grinding wheel, of an oscillating work-head, a rotating work-carrying shaft or spindle mounted on said work-head so as to oscillate therewith, and means for carrying power to said shaft or spindle from the axis of said oscillating work-head.

In testimony whereof I affix my signature.

LEWIS R. HEIM.